Dec. 26, 1967     F. G. M. FERRIE ETAL     3,359,734
ELECTROTHERMAL PROPULSION UNIT OF THE
ELECTRIC ARC TYPE
Filed Nov. 15, 1965     3 Sheets-Sheet 3
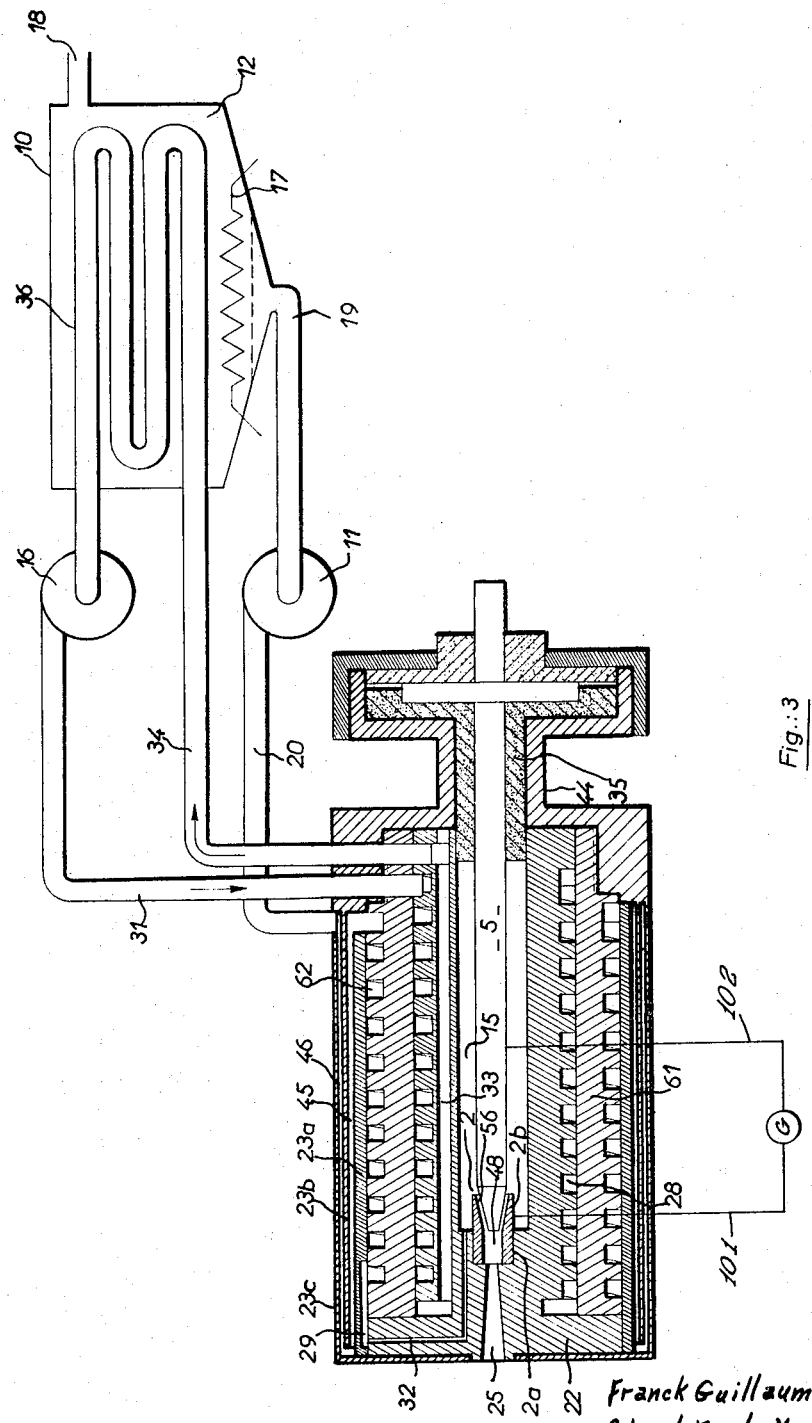
Fig.:3
Inventors
Franck Guillaume Michel Ferrie
Robert Emile Marchand-Revers
Christian Pierre Jean Marjon
Stevens, Davis, Miller & Mosher
Attorneys United States Patent Office 3,359,734
Patented Dec. 26, 1967

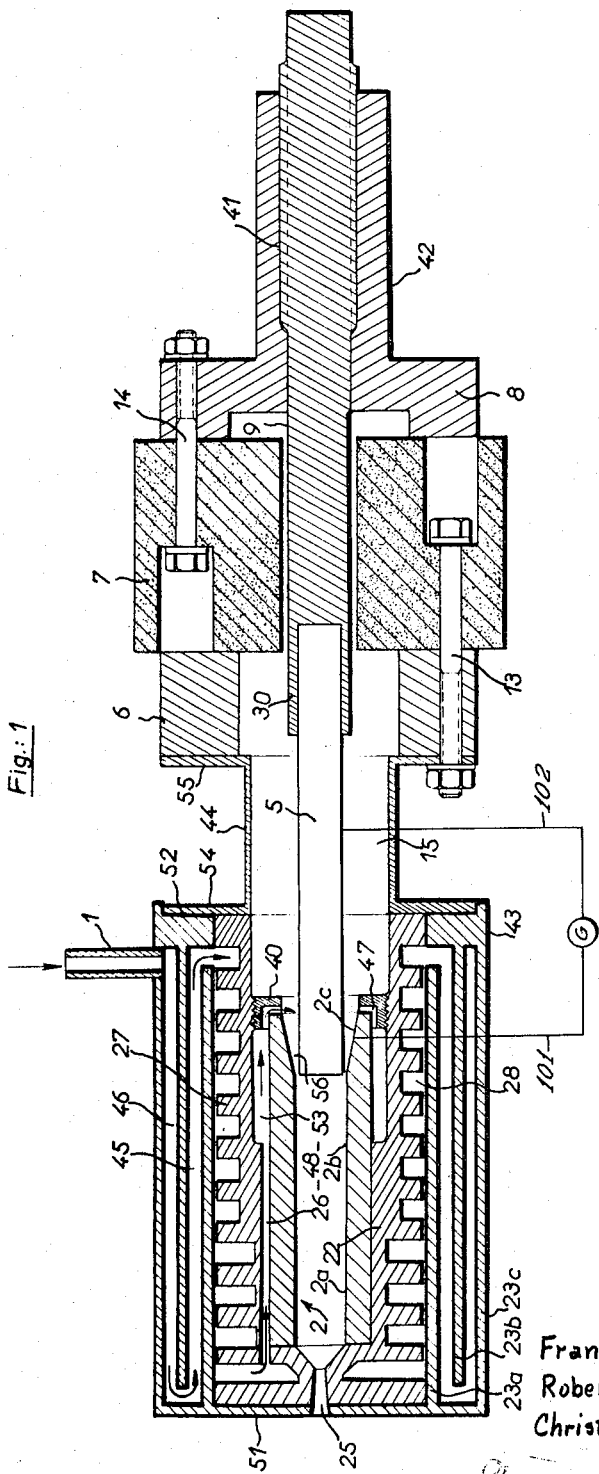

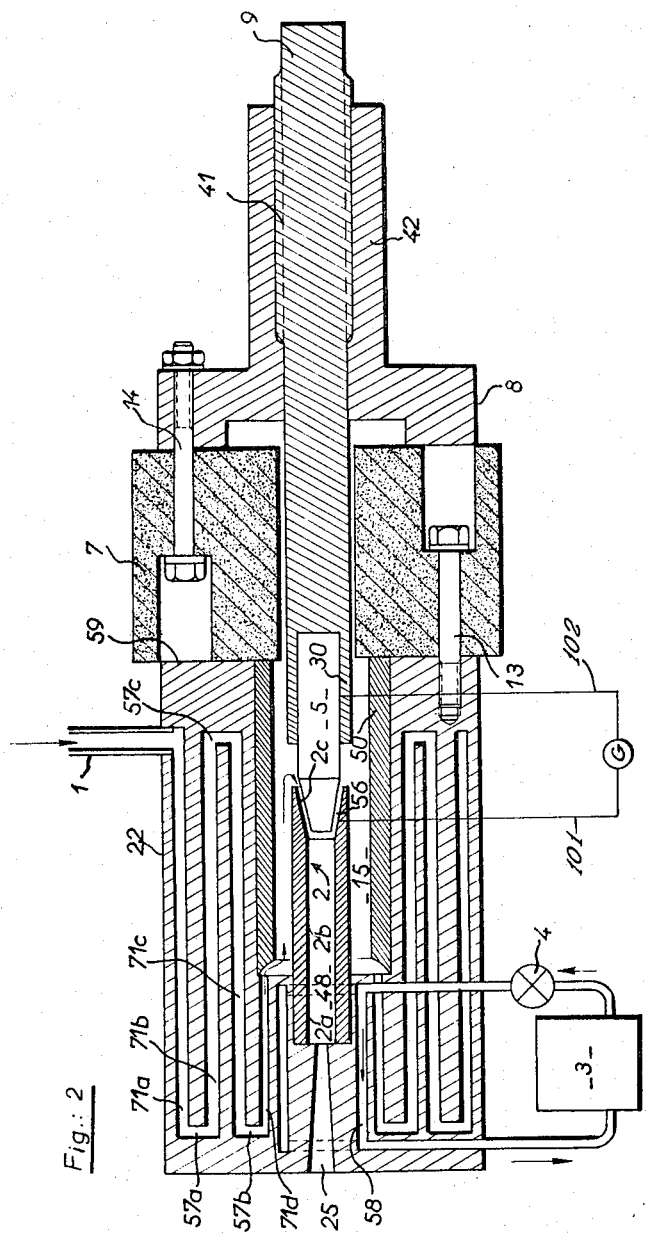

3,359,734
ELECTROTHERMAL PROPULSION UNIT OF THE ELECTRIC ARC TYPE
Franck Guillaume Michel Ferrie, Cachan, Robert Emile Marchand-Revers, Paris, and Christian Pierre Jean Marion, vert Saint-Denis, France, assignors to Societe Nationale d'Etude et de Construction de Moteurs d'Aviation, Paris, France, a company of France
Filed Nov. 15, 1965, Ser. No. 507,883
Claims priority, application France, Nov. 19, 1964, 995,610
13 Claims. (Cl. 60—203)

ABSTRACT OF THE DISCLOSURE

An electrothermal propulsion unit of the electric arc type having a hollow first electrode and a second electrode having at least a portion situated within and extending in spaced relationship to one end portion of the first electrode to define an arc chamber therebetween, means being provided to apply a potential difference between the electrodes to strike an arc therebetween. Heat exchange means cooperate with the other end portion of the first electrode in direct contact and heat exchange relationship therewith, and has a passage for the flow of propellant therethrough. An intermediate chamber surrounds said one end portion of said first electrode and connects the passage and the arc chamber, so that propellant can be supplied through the passage and the intermediate chamber to the arc chamber and ejected from the arc chamber through a nozzle.

---

This invention relates to an electrothermal propulsion unit of the electric arc type.

Such a unit is essentially composed of:

A chamber in which the arc, which is struck between two electrodes, heats the propelling fluid flowing therein so that the electrical energy of the arc is converted into heat energy in the fluid;

An ejection nozzle, the purpose of which is to convert the heat energy of the gas into kinetic energy, thus imparting to it an ejection velocity which is as great as possible;

A system of injecting the propellant into the chamber;

A cooling device designed to protect the material against the high temperatures.

In the description given hereinafter, "rear" will designate the direction in which the ejection of the hot gases takes place and "front" the opposite end. One of the electrodes is invariably formed hollow and in accordance with custom, this hollow electrode will be called the "anode" and the other electrode will be called the "cathode," but the "cathode" may be at a higher potential than the "anode" and the current may also be alternating.

The propellant used may be solid (lithium, for example), liquid or gaseous at room temperature, but must have a low molecular weight.

Generally, the anode is hollowed out into a cylindrical or conical internal shape and the cathode is generally of solid cylindrical shape but has a conical end extending into the anode.

The arc is struck in the anode between the inside walls of the latter and the cathode. It is in the arc chamber thus formed that, as a result of the heating of the gas to a very high temperature, a partial dissociation of the molecules ($H_2$ into $2H$, for example) and a certain degree of ionization occurs.

The anode, which may be of tungsten, is brought to a very high temperature. In order to avoid destruction or too rapid wear thereof, it has already been proposed to form one or more internal ducts therein and cause a cooling liquid to circulate therethrough. A considerable part of the heat transmitted to the liquid is given up to the medium outside the apparatus however, and this decreases efficiency, but as electrical energy is particularly costly in the space field, it is imperative to obtain as high an efficiency as possible from the propulsion unit.

Moreover, when the anode is cooled only by radiation, its outer surface reaches high temperatures and the result is a considerable loss of energy.

Some devices incorporate recovery or regeneration of calories by the gas, which follows a longer path and is heated as it passes between the anode and the cathode. The latter then comprises heat-transmitting fins. However, owing to the fact that the gas only sweeps over the inside of the wall of the anode (which is an integral body of tungsten or molybdenum), the outside of the wall is still brought to a high temperature and a considerable quantity of energy is radiated as a pure loss. There is also a type of ejector providing, around the anode, a cooling circuit operating with the propelling fluid, which is thus heated before it enters the arc.

As the anode is brought to a very high temperature by the arc, it radiates heat towards the outside. In order to avoid the loss resulting from such radiation, it is advantageous to provide around the anode an exchanger through which the propellant travelling towards the arc chamber passes, so that the propellant can thus recover the heat coming from the anode. Effectiveness of this exchanger, however, requires the use of a metal which is a good conductor, such as copper, the melting point of which is relatively low.

According to one feature of the present invention, to enable this exchanger to be effective and of useful life, only the rear portion of the anode is fitted into the said exchanger, while the front portion of the anode, which contains the arc zone and which is brought to the highest temperature, is separated from the exchanger by an annular chamber which is traversed by the propellant leaving the passages of the exchanger before it penetrates into the arc chamber.

One of the results of this arrangement is that the heating of the propellant is effected in at least three stages, the first in the passages of the exchanger, the second in the chamber surrounding the front portion of the anode and the third in the arc.

According to another feature of the invention, which may be combined with the foregoing feature or, on the other hand, used separately, an auxiliary fluid-circuit is associated with the exchanger through which passes the propellant travelling towards the arc chamber, so as to remove the excess heat and carry it towards the reserve of propellant, where this heat is utilised either for heating the propellant or for producing a change of state of the latter, and in particular for melting a propellant stored in the solid state.

Moreover, in order to lower the external temperature of the anode as much as possible and thus reduce the losses by radiation, the surplus heat not transmitted to the propellant when it passes through the exchanger, if any, is either given up to the propellant in a preliminary path between heat screens, or given up to a coolant, or removed to the outside by a radiator, or removed or recovered or eliminated by any other means.

The description which follows with reference to the accompanying drawing given by way of non-limitative example will make it clearly understood how the invention can be carried into effect, the details appearing both from the drawing and from the description forming further features of the said invention.

In the drawings, FIGURES 1, 2 and 3 respectively show in longitudinal axial section three embodiments of propulsion unit embodying the invention.

In the ejector of FIGURE 1, the rear portion 2a of a tubular anode 2 is fitted into a heat exchanger; the front portion projecting freely towards a cathode 5.

The ionization chamber is extended towards the front by a connecting piece 44, having a flange 54 which is fixed to the exchanger and a flange 55 which is fixed to an intermediate ring 6. This ring 6, a collar 7 insulating the anode from the cathode, and a cathode support 8, are held in pairs by two sets of bolts 13 and 14. Adjustment of the position of the cathode with respect to the anode is effected by screwing of the cathode holder 9 in to the tail 42 of the support 8.

The anode 2 and the cathode 5 are connected by electric current leads 101 and 102 to a current generator G.

The heat exchanger is divided into two parts:

An inner block 22 of copper or other material which is a good conductor, in which the rear portion 2a of the anode is mounted along the axis and which contains various recesses;

A series of cylindrical shields 23a, 23b, 23c made of refractory material and surrounding the abovementioned block 22.

The propelling gas enters the exchanger through the feed pipe 1 and flows between the three shields 23, the shields 23b and 23c being provided with breaks at the front and the rear for the passage of the fluid along a suitable path. The gas then arrives at the block 22, where it passes through one or more helical grooves 28, which, however, may have any other suitable form other than helical, the said grooves being cut in the periphery of the block.

From the rear towards the front, the gas passes through passages 26, which are straight, helical or of any other suitable form and are hollowed out around or in the walls of the bore of the block 22 supporting the anode 2. The gas then passes out into an annular chamber 53 and enters a chamber 15, whirling in the space between the anode and the cathode owing to the tangential slots in a member 40 performing the function of an injector. This process is facilitated by providing a conical inlet 2c inside the anode.

Different suitable potentials having been applied to the electric current leads of the ejector, the arc is struck between the anode 2 and the cathode 5 in the ionization chamber 48. The hot propellant, passing through the arc, is partially dissociated and ionized and furnishes the high-velocity propelling jet ejected by a nozzle 25.

The ejector having been described and the operation thereof explained, the conditions to be satisfied from the thermal point of view by the exchanger, the anode and the nozzle will now be examined.

The heat exchanger 22 is made of a material having a high coefficient of thermal conductivity which permits easy removal of the heat of the anode. It serves as a medium for transferring the heat from the anode to the propelling gas by increasing the area of surface available for effecting heat transmission to the gas. The latter can thus attain the greatest temperature compatible with good behavior and long life of the material of the exchanger. The geometrical form of the exchanger block and the circuit followed by the gas in the exchanger are devised to bring the calories, given up to the anode by the arc at the center of the ejector, towards the periphery and towards the front, with a flow of calories which is sufficiently large but not critical.

The surface of contact between the anode (which is of tungsten or molybdenum for example) and the block (which is of copper, for example) is calculated to dissipate a heat flux adequate for the gas flow rates and electric powers used, so as to remain always below the melting temperature of the block. Cooling fins (helical, circular, etc.) are machined at the periphery of the block in order to obtain the desired exchange surface between the metal and the gas while maintaining, along the path of the propelling fluid, differences in temperature level which are as large as possible so as to limit the dimensions of the assembly.

The series of shields of refractory material enables the heat radiated by the block to be regenerated in the cold gas which has not yet passed into the said block. The outer surface of the ejector is thus maintained at a temperature which is as close as possible to the surrounding temperature, thereby limiting to the maximum the external heat losses of the ejector due to radiation.

As the temperature assumed by the propelling gas in the course of its travel through the exchanger is limited by the melting temperature of the material, it is necessary, in order to bring the gas to a higher temperature, to heat it afterwards on a surface of refractory material. It is that surface part of the anode 2, which is not fitted into the block 22 and around which the gas whirls, which performs this function. The propellant is rapidly heated by contact and especially by convection and radiation as it follows the hottest part of the anode and the space between the cathode and the anode. The latter thus gives up calories to it while being cooled.

The high temperature of the free portion of the anode can be obtained without danger to the ejector, since the anode has no contact at this portion with the block, and the shape given to the anode is designed to create suitable temperature gradients longitudinally while the striking surfaces of the arc are correctly positioned.

The ejection nozzle 25 may be machined in one piece with the anode (i.e. of tungsten or molybdenum). However, since the nozzle is subjected to less severe conditions than the anode, it may, up to a certain maximum level of gas enthalpy, be machined in the exchanger itself, which permits a better heat exchange.

FIGURE 2 shows as a variant a composite type of apparatus enabling the heat exchanger to be kept below the critical temperature by circulation of an auxiliary cooling fluid when the flow of propellant is insufficient to fully ensure cooling (with high power and with a high enthalpy level, for example).

As before, the hollow anode 2 is fitted at its rear portion into the heat exchange 22, the front portion jutting out into the chamber 15, the peripheral wall of which is formed by a jacket 50 of refractory material. The collar 7, which is fixed to the front face 59 of the exchanger 22 by three bolts 13, insulates the anode electrically from the cathode, the support 8 of which is mounted on the said collar by means of the three bolts 14.

In the block 22 there are hollowed out concentric annular ducts 71a, 71b, 71c and 71d communicating with one another at their ends through compartments 57a, 57b and 57c which are likewise annular. Into the first duct there opens a propellant feed pipe 1 and the propellant itself passes out into the chamber 53. The nozzle 25 is machined in the central rear portion of the block and opens into the anode passage 48.

An annular duct 58 is also provided in the block, with inlet and outlet conduits for cooling fluid.

The propellant enters the exchanger through the feed pipe 1 and, as it follows the path 71a, 57a, 71b, 57c, 71c, 57b, 71d, regenerates part of the heat originating from the rear portion of the anode and given up to the block 22 by conduction.

Such propellant then passes into the chamber disposed around the overhanging portion of the anode, which gives up calories to it by convection and radiation, and finally passes through the space between the electrodes, in which the arc is struck.

The temperature of the propellant, which is limited at the first stage by the melting temperature of the material of the block, can rise considerably in the course of the second and third stages which take place in the arc chamber.

The other part of the heat of the block 22 is given up by conduction to a cooling fluid in the course of its passage through the annular duct 58. The latter forms part of a closed circuit in which there is a radiator 3 removing the heat outside the ejector and, if necessary, a pump 4 for activating the circulation of this auxiliary fluid.

FIGURE 3 shows a second variant of the ejector in which the radiator previously mentioned is replaced by a heat exchanger which serves as a liquefier for the propellant used in the solid state (lithium, for example). In this case, the latter is liquefied, before it enters the ejector, in order to ensure a regular flow thereof. For this purpose there is used the surplus heat originating from the anode, when that employed in raising the temperature of the propellant has already been taken into consideration. In the absence of this device, this heat would be lost by radiation.

The anode 2 is disposed, as before, in the block 22 and so that it juts into the chamber 48. The cathode 5 is again mounted so that it is insulated from the anode by the part 35 held in the support 44.

A helical groove 28 is formed in the periphery of the block 22. The latter is surrounded by an annular block 61 also provided with a helical groove 62 in its periphery. The assembly is surrounded in turn by three concentric shields 23a, 23b and 23c defining two annular chambers 45 and 46. The chamber 46 has access to the outside by means of a connection through the shield 23c, the two chambers intercommunicating through breaks in the intermediate shield 23b, and the shield 23a provides an exit from the chamber 45 to one end of the groove 62. The other end of the groove 62 communicates with the chamber 15 by way of the space 29 hollowed out in the shield 23a and the ducts 32 drilled in the block 22.

The groove 28 has two means of communication 31 and 34 with the outside extending through the parts surrounding it, in the second case through the medium of the ducts 33.

The heat exchanger 10, which is outside the ejector, comprises a coil 36 disposed in a chamber 12 provided with an inlet 18, an outlet 19 and a screened electric heating resistor 17. The coil 36 communicates with the groove 28 through the two corresponding connections, the pipes 31 and 34 and, if required, the pump 16. The outlet 19 of the chamber 12 communicates with the chamber 46 through another pump 11, the pipe 20 and the connection in the outer shield 23c.

An intermediate fluid is used as a medium for transferring the heat from the block 22 to the exchanger 10 for liquefying the solid propellant (lithium, for example) before it enters the ejector.

The solid propellant enters the exchanger 10 at 18 and leaves at 19 in the liquid state, reaches the ejector through the pipe 20, passes through the chambers 46 and 45, the groove 62 and the ducts 32 and arrives in the ionization chamber 48 after becoming heated on the anode and the cathode. The process of increasing the temperature of the propellant is the same as that described in connection with FIGURE 1, which also involves shields and a groove in the heat exchanger block. The auxiliary coolant moves in closed circuit. It passes through the groove 28 and the ducts 33, cooling the block 22, enters the pipe 34, follows the coil 36, where it gives up heat to the solid propellant, and returns to the ejector by way of the pipe 31. The circulation of the coolant may be natural or ensured by means of the pump 16.

During its passage through the exchanger, the coolant can reach temperatures sufficiently high to permit the liquefaction of the propellant under good conditions (melting point of lithium: 180° C.).

It will be observed that the exchanger described comprises two helical grooves, one of which is traversed by the propelling fluid and the other by the cooling fluid.

On starting, the solid propellant is heated by the resistor 17.

This arrangement could also be used with a liquid propellant, the two circuits then assisting increasing the heat of the propellant.

The cooling fluid may be the liquid propellant itself.

The grooves used in these three embodiments may not necessarily be helical, but may have any other suitable form, for example circular, with or without communication apertures or recesses between them. In the case of helical grooves or circular grooves with communication apertures, the summits between the grooves will advantageously be in contact with the shield or block facing them, so as to compel the fluid to follow the designed path. On the other hand, in the case of discontinuous grooves, an intermediate space must be left.

Other modifications are possible within the scope of the invention as defined by the appended claims.

What is claimed is:

1. An electrothermal propulsion unit of the electric arc type, comprising a hollow first electrode having a nozzle at one end thereof, a second electrode having a portion situated within and extending in spaced relationship to the other end of said first electrode to define an arc chamber therebetween, means for applying a potential difference between said electrodes to strike an arc therebetween, a heat exchange block surrounding said first electrode and in contact with its outer peripheral surfaces adjacent said one end thereof, a plurality of heat exchange grooves formed in the outer peripheral surface of said block, said first electrode and said block defining a passage at said one end of said first electrode, and an annular, enlarged, intermediate chamber at said other end of said first electrode, said chamber connecting said passage and said arc chamber, means for supplying a propellant through said grooves from which it then passes into said passage, and then through said intermediate chamber into said arc chamber where it is heated and ejected from said nozzle.

2. An electrothermal propulsion unit as claimed in claim 1 wherein said first electrode is generally of a cylindrical form while said second electrode is generally of a solid cylindrical form and concentric with the first electrode, whereby a generally annular arc chamber is formed, said intermediate chamber being concentric with said arc chamber.

3. An electrothermal propulsion unit as claimed in claim 2, wherein said heat exchange block is of an annular cross section, is of a good thermal conductivity, and is concentrically mounted with respect to said electrodes.

4. An electrothermal propulsion unit as claimed in claim 3, wherein said heat exchange block is surrounded by concentric shields of refractory material between which the propellant flows before entering said grooves.

5. An electrothermal propulsion unit as claimed in claim 4, further comprising auxiliary means for conveying heat from said heat exchange block, said auxiliary means being constituted by a closed fluid circuit, and means for causing circulation of the fluid in said closed circuit.

6. An electrothermal propulsion unit as claimed in claim 1, wherein said heat exchange block is surrounded by shields of refractory material between which the propellant flows before entering said grooves.

7. An electrothermal propulsion unit as claimed in claim 1, further comprising auxiliary means for conveying heat from said heat exchange block, said auxiliary means being constituted by a closed fluid circuit and means for causing circulation of the fluid in said closed circuit.

8. An electrothermal propulsion unit as claimed in claim 5, in which the closed fluid circuit, at a point thereof remote from said heat exchange block, is in heat exchange relationship with the propellant at the propellant supply means.

9. An electrothermal propulsion unit as claimed in claim 8, in which the propellant supply means comprises a store for solid propellant, the auxiliary cooling means for the heat exchange block being used for melting said solid propellant.

10. An electrothermal propulsion unit of the electric arc type, comprising a hollow first electrode, a second electrode situated at least partly within and in spaced relationship to one end portion of said first electrode to define an arc chamber therebetween, means for applying an arc-striking potential difference between said electrodes, propellant supply means, a heat exchanger in heat exchange relationship with said first electrode, said heat exchanger affording passage for the flow of propellant to the arc chamber, means for causing the propellant to flow from the supply means through the heat exchanger passage to the arc chamber, a diffuser through which propellant is ejected from the arc chamber, and a closed fluid circuit in which fluid flows for conveying surplus heat from the heat exchanger, such closed fluid circuit being in heat exchange relationship with the propellant at the propellant supply means.

11. An electrothermal propulsion unit as claimed in claim 10, in which the propellant supply means comprises a store for solid propellant, the auxiliary cooling means for the heat exchange means being used for melting such solid propellant.

12. An electrothermal propulsion unit as claimed in claim 11, including means defining a propellant heating chamber intermediate the heat exchanger passage and the arc chamber.

13. An electrothermal propulsion unit as claimed in claim 12 wherein the heat exchange means is surrounded by concentric shields of refractory material between which the propellant flows before entering the passages of the heat exchange means.

References Cited

UNITED STATES PATENTS

| | | | |
|---|---|---|---|
| 2,862,099 | 11/1958 | Gage | 60—203 |
| 2,900,168 | 8/1959 | Nyborg | 60—260 X |
| 2,922,869 | 1/1960 | Giannini, et al. | 219—121 |
| 3,016,693 | 1/1962 | Jack et al. | 60—203 |
| 3,042,830 | 7/1962 | Orbach | 313—231 |
| 3,077,108 | 2/1963 | Gage et al. | 219—121 |

FOREIGN PATENTS

| | | |
|---|---|---|
| 1,368,255 | 6/1964 | France. |
| 920,079 | 3/1963 | Great Britain. |

CARLTON R. CROYLE, *Primary Examiner.*